July 12, 1966
G. H. LISTER
3,260,299
TRANSISTOR IGNITION SYSTEM
Filed Oct. 20, 1964
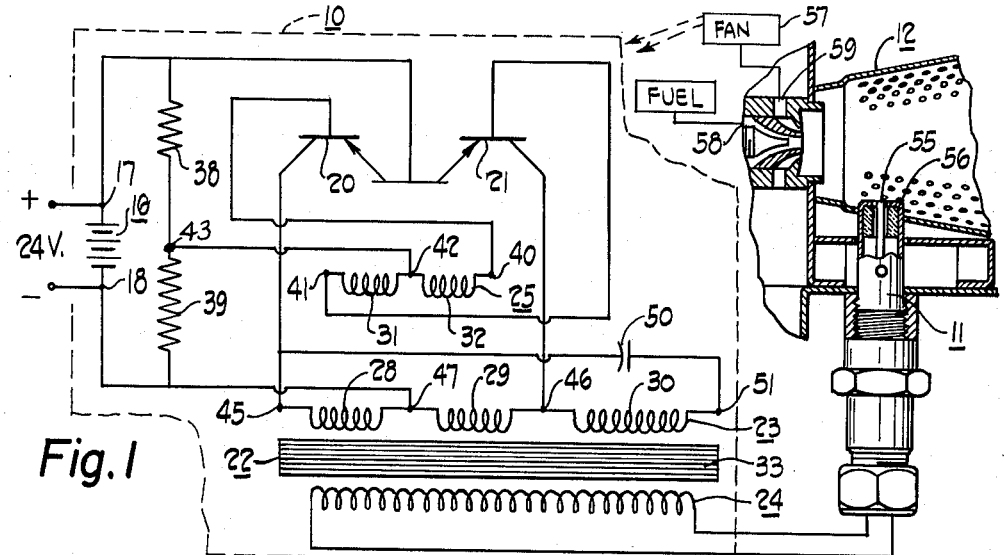
Fig. 1
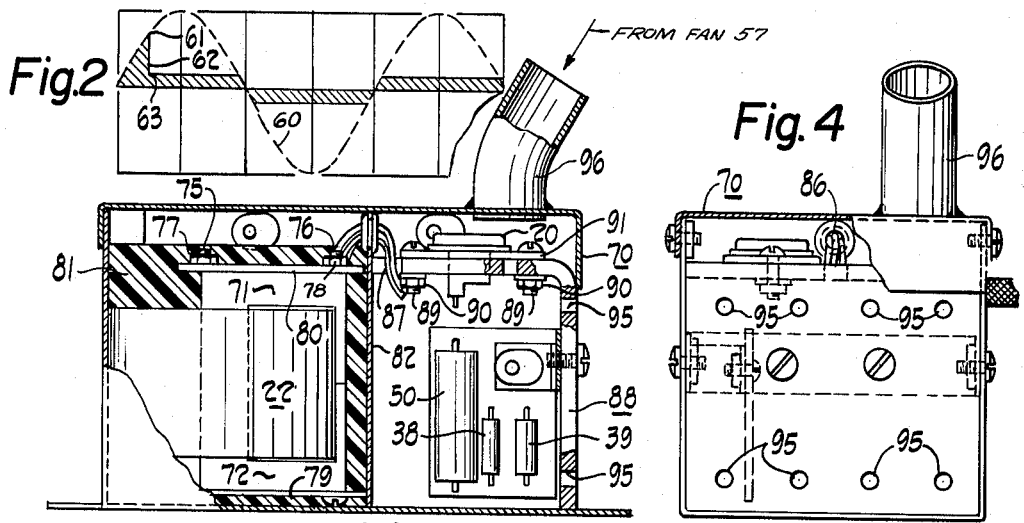
Fig. 2
Fig. 3
Fig. 4
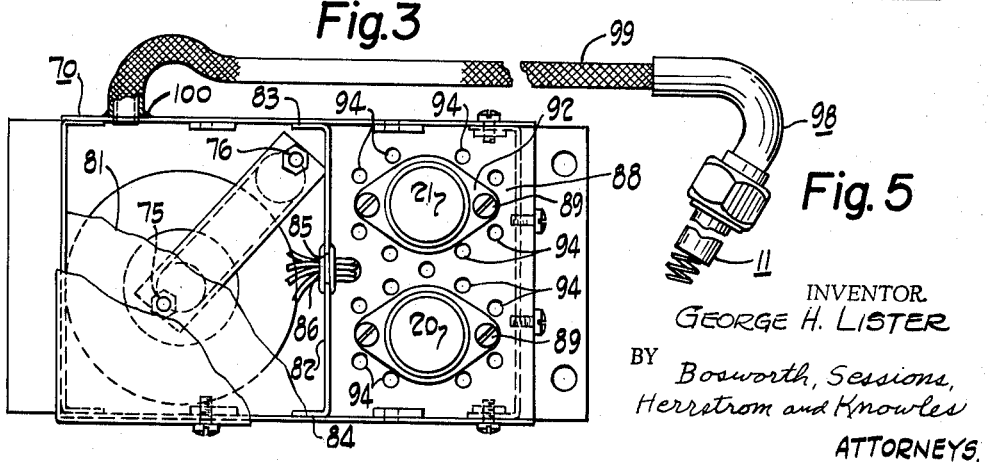
Fig. 5
INVENTOR.
GEORGE H. LISTER
BY Bosworth, Sessions,
Herrstrom and Knowles
ATTORNEYS.

United States Patent Office 3,260,299
Patented July 12, 1966

3,260,299
TRANSISTOR IGNITION SYSTEM
George H. Lister, Cleveland, Ohio, assignor to Hunter Manufacturing Company, Solon, Ohio, a corporation of Ohio
Filed Oct. 20, 1964, Ser. No. 405,063
6 Claims. (Cl. 158—28)

This invention relates to fuel burner ignition systems and, more particularly, to a solid state fuel burner electronic ignition system.

Priorly, numerous attempts have been made to provide electronic ignition systems for fuel burners by connecting an oscillator circuit to a spark plug. These systems, however, have exhibited numerous disadvantages. For example, certain of these systems require relatively high input power and are therefore relatively inefficient. Certain others of these systems cause radio frequency interference by the discharge across the spark gap. If attempts are made to suppress the radio frequency interference by placing a capacitor across, or in parallel with, the contacts of the ignition plug, the result is a reduction of the voltage applied across the electrodes and a reduction of the efficiency of the system. Further, although numerous systems have been devised for controlling the ignition of internal combustion engines, these systems are not suitable for fuel burners because of the differences in problems and requirements. For example, the important requirement of the fuel burner is that a substantially uniform combustion be maintained whereas, in an internal combustion engine, the requirements are intermittent, precisely timed firing of the spark plugs, or glow plugs. Because of the high temperature and low ignition point of the gasoline in internal combustion engines, it is not necessary that the spark be of extended duration or that the spark be particularly hot. In fuel burners, however, it is essential that the sparks be hotter because the fuel has a relatively high ignition point. Further, if the fuel comes in contact with the plug, it has a tendency to decrease the capabilities of the plug to ignite the fuel.

Attempts have been made in the past to employ transistor oscillator circuits as sources of alternating current energy to operate a spark igniter in a fuel burner. These circuits exhibit numerous disadvantages. For example, transistor oscillator circuits which are highly stable in normal operation, such as in radio circuits, are unsuited for spark igniter driving circuits because, when the spark is established across the discharge points for a substantial period of time, this spark acts as a substantially short circuit which is reflected from the secondary winding of the transformer into the primary winding to constitute an unusually heavy load approximating a short circuit on the transistors. The result is an excessive heating of the transistors and a loss of the normal oscillating frequency. Still another disadvantage of this transistor type circuit has been poor starting characteristics as evidenced by the inability to start the oscillations after a heavy load is reflected on the secondary and inability to start when the circuit is initially closed. Although oscillator starting circuits are well known, these circuits are relatively complex and employ a relatively large number of parts which unduly increase the cost of a system employing such a circuit.

Accordingly, it is an object of this invention to provide an improved ignition circuit.

It is another object of this invention to provide an ignition circuit particularly adapted to fuel burners.

Still another object of this invention is to provide a solid state ignition system which is reliable in operation, economical in construction, and requires relatively few parts.

It is yet another object of this invention to provide a semi-conductor ignition system which is highly efficient and reliable in operation.

It is a still further object of this invention to provide an ignition system which is relatively free of radio frequency interference.

Briefly, in accordance with aspects of this invention, I have discovered a novel semi-conductor fuel burner ignition system employing a starter circuit which is reliable in operation and requires only two parts positively to start a semi-conductor oscillator circuit. Advantageously, this starter includes a pair of resistors serially connected across a direct current source of energy to apply a forward bias to the semi-conductors of the oscillator circuit. In one illustrative embodiment, a pair of transistors and a transformer are connected to the starting circuit in a manner such that the transistors and transformer define a highly efficient push-pull oscillator circuit.

In accordance with another aspect of this system, a tank circuit is provided in the primary of the transformer to sustain the sine-wave oscillations regardless of extreme changes in load, which changes normally occur during the operation of the system. This tank circuit includes an additional transformer coil and a serially connected capacitor connected in parallel with the primary coil such that the additional coil provides an auto-transformer action in the primary which permits the use of a relatively small and consequently inexpensive capacitor while producing the required output potential in the secondary.

In accordance with other aspects of this invention, I provide an oscillator type spark ignition system in which the oscillator circuit is loosely coupled to, and therefore relatively independent of, the highly variable impedance of the secondary, or spark gap, circuit. This impedance of the oscillator circuit is due to a relatively loose coupling between the primary and the secondary windings by the use of a low permeability core, i.e., one in which the permeability is less than 500 at 20 gausses.

According to other aspects of this invention, I employ a push-pull type transistor oscillator circuit in which the primary winding of the transformer is part of a tank circuit which tunes the oscillator to a frequency having a half-cycle period less than the deionization time of the spark gap such that, once the oscillations start, a sine wave voltage is applied to the gap and the gap remains ionized until the oscillator is turned off. This results in a substantial elimination of radio frequency interference which occurs only during ionization, or breakdown of the spark gap. Also, by maintaining the spark gap ionized, the efficiency of the system is greatly increased because less power is required to maintain the ionization than that required to repeatedly break down or ionize the discharge gap.

In accordance with yet other aspects of this invention, I employ a blower for blowing air into the fuel burner and for delivering cooling air to the transistor components. Advantageously, the transistors are mounted on a heat sink positioned in the path of the blower air to thus reduce the temperature of the transistors and maintain a constant operating characteristic in the transistors.

A better understanding of the invention will be afforded by the following detailed description of a suitable embodiment considered in conjunction with the accompanying drawings forming a part of the specification and constituting the best known mode of practicing the invention.

In the drawings:

FIG. 1 is a combined schematic and side elevational view, partly in section, of one illustrative igniter system according to this invention;

FIG. 2 is a group of time plots illustrating the operation of certain portions of the system of FIG. 1;

FIG. 3 is a view in elevation, partly in section, of a cabinet with certain of the components of the system of FIG. 1 mounted in the cabinet;

FIG. 4 is a side view of the structure of FIG. 3, taken along the lines 4—4 thereof, and looking in the direction of the arrows; and FIG. 5 is a plan view of the structure of FIG. 3, taken along the lines 5—5 thereof, and looking in the direction of the arrows.

Referring now to FIG. 1, there is depicted one illustrative embodiment of this invention in which an oscillator circuit 10 is coupled to an igniter plug 11 for igniting the fuel in a combustion chamber 12 in a manner which will be subsequently described. The oscillator circuit 10 includes a direct current source 16 having a positive terminal 17 and a negative terminal 18. In this particular embodiment, the source 16 is indicated as being a battery, however, any other source of direct current potential of suitable magnitude and current capacity could be employed. The battery 16 is employed to supply power to a pair of transistors 20, 21 connected in a push-pull type oscillator circuit including a transformer 22. The transformer 22 includes a primary winding 23, a secondary winding 24, and a tertiary winding 25. The primary winding 23 is made up of three serially connected coils 28, 29 and 30. The tertiary winding 25 is made up of a pair of serially connected coils 31 and 32. The transformer 22 includes a core 33 which is formed of low permeability material for the purpose of loosely coupling the windings in a manner which will be subsequently described.

The transistors 20, 21 are provided with a starting circuit including a pair of resistors 38, 39 serially connected between the terminals 17, 18 of the battery 16. Transistors 20, 21 are P.N.P. type transistors, each having three electrodes, namely, an emitter, a collector, and a base electrode. It is understood, however, that N.P.N. transistors could be employed by reversing the battery polarity. These transistors are connected together in a common emitter configuration by having both emitters connected to the positive terminal 17 of the battery 16. The base of transistor 20 is connected to a terminal 40 of the tertiary winding 25 and the base of transistor 21 is connected to a terminal 41 on the opposite end of tertiary winding 25. The tertiary winding 25 has a center tap 42 which is connected to a terminal 43 intermediate the starting circuit resistors 38, 39. The collector of transistor 20 is connected to a terminal 45 of the coil 28 on the primary winding 23 and the collector of transistor 21 is connected to a terminal 46 between the coils 29, 30 of the primary winding 23. The tap 47 between coils 28, 29 is connected to the negative terminal 18 of the battery 16. The starting circuit is thus a potential divider for the potential of the battery 16 such that the resistor 38 determines the potential applied between the bases and emitters of the transistors 20, 21. Similarly, the resistor 39 determines the potential applied between the bases and collectors of the transistors 20, 21. Preferably, the resistor 39 is many times larger than the resistor 38 such that a much greater potential is applied between the bases and collectors than is applied between the bases and the emitters of the transistors 20, 21. For example, in one illustrative embodiment, the ratio between resistors 38, 39 was approximately 50 to 1. Accordingly, the transistors would be forward biased such that they will always tend to generate alternating current regardless of the condition of the secondary circuit including the secondary winding 24 and the spark discharge plug 11.

Advantageously, the frequency of oscillation is controlled by a tank circuit including a capacitor 50 which is connected from a terminal 51 of the coil 30 of the primary winding 23 to the terminal 45 of the coil 28 of the primary winding 23. Thus the combination of the primary winding 23 and the capacitor 50 act as a tank circuit for the transistors 20, 21. The use of the coil 30 as a portion of the tank circuit permits the use of a smaller and therefore less expensive capacitor 50 than would otherwise be required to obtain the desired frequency. For example, for a frequency of 7 kilocycles, a tank circuit may be provided with a capacitor of one microfarad and an inductance of 0.5 millihenry. If, however, the inductance is increased to 3.0 millihenries, a capacitor of only 0.22 microfarad is required. It is more economical to employ the latter combination than the former because the savings in cost between the two capacitors is greater than the added expense of additional turns of wire on the inductance. By having a separate coil 30 as part of the tank circuit it is possible to match the characteristics of the transistor collectors with the impedances of the coils 28, 29 and yet employ the desired inductance in the tank circuit.

*The operation of the system*

This system is basically a transistor inverter circuit inverting a relatively low direct current voltage to a relatively high alternating current voltage of substantially sine-wave shape and applying this voltage across a pair of ignition electrodes 55, 56 of the spark plug 11. The low voltage drop of the conducting transistor switch makes this system ideal for a direct current to alternating current inversion from low voltage direct current as compared to mechanical choppers, such as a vibrator. Because the operation of this system does not require a precise frequency, it is acceptable to have the inverter free-running provided the frequency is within the desired range. Advantageously, the circuit develops a sine wave voltage which has a frequency such that the period between the times that the pulses of alternate polarity reach a sustaining magnitude is insufficient to permit the gap between the electrodes 55, 56 to deionize. I have discovered that a given gap between the electrodes, such as a gap of the order of $\frac{1}{16}''$ has a breakdown or arc-creating potential of the order of 3,000 volts and a deionization or arc-extinction period which in air and gas or oil vapor appears to be of the order of $\frac{1}{1000}$ second.

A frequency of 500 cycles per second or more will not allow the arc to extinguish, or deionization to take place. Preferably, a frequency of at least 1000 cycles is employed to reduce the size of the inductance in the tank circuit. This continuous ionization results in a greatly increased efficiency of the system. For example, while a given gap between electrodes may require a relatively high breakdown potential, for example, a peak voltage of the order of 7,000 volts for a gap of the order of $\frac{1}{8}''$, a relatively small potential is required to maintain a discharge across these electrodes provided the period between successive pulses is so short that it does not permit the ions within the electrode gap to deionize. Thus, although 7,000 volts are required initially to produce a discharge, a potential of only 600 volts is sufficient to maintain this discharge if the period between successive values of at least 600 volts is less than the deionization time of the spark gap. The deionization time is a function of gap length, temperature and composition of the material in the space between electrodes and electrode geometry. As stated above, for a fuel ignition type discharge plug having an electrode spacing of $\frac{1}{16}''$, the deionization time is of the order of 0.001 second. Any sine wave voltage of gap sustaining magnitude whose frequency is above one kilocycle maintains this gap ionized because the period between successive values of sustaining magnitude is less than the gap deionization time. It is therefore an important aspect of this invention to employ in this system a tank circuit including coil 30 and capacitor 50 to maintain the frequency of the oscillator at least above a predetermined minimum value which would permit gap deionization between half cycle sustaining values of the gap voltage.

To assure self-starting of the inverter circuit, a bias voltage is applied between the emitter and base electrodes of the transistors 20, 21 by means of the potential drop across resistor 38. This bias drives the base of the transistors below the voltage of the emitters and the transistor having the lower starting characteristic is driven into conduction. As a result of this voltage drop across the transistors 20, 21, current flows in one of the coils 28 or 29 of the collector or primary winding 23. This primary current flow produces a magnetic flux in the core 33 which, in turn, induces a current in the secondary winding 24. When the total flux change in the primary winding 23 equals saturation of the core, the conducting transistor cannot supply the increasing exciting current and the current switches to the other transistor. The voltage generated in the feedback winding 25 is fed to the base of the other transistor which develops a voltage of opposite polarity due to the phase shift in the transformer 22. This feedback voltage tends to cut off the conducting transistor while the relaxation of this voltage allows the transistor to again conduct. Normally, the transistor inverter is a pulse type generator due to the saturation of the core material in core 33. During the operation of this circuit, however, the circuit operates as a normal inverter only until a spark discharge occurs between the electrodes 55, 56. At discharge, the circuit no longer acts as an inverter but begins to oscillate.

The spark discharge

The spark or arc discharge between electrodes 55, 56 has a profound effect upon the operation of the system. An arc is created by relatively high potential across an anode-cathode gap. At some applied potential, the field strength across the gap becomes high enough so that the energy accumulated by the positive ions travelling in the gap is sufficient to allow the positive ions to bombard the cathode so strongly that secondary emission from the cathode 56 to the anode 55 takes place. If the emitted secondary electrons can, in turn, ionize by collision so that sufficient ions will reach the cathode and again cause emission, the discharge sustains itself. At this potential, when the discharge becomes self-sustaining, the gap is said to break down and the value of the voltage is called the ignition or breakdown potential. This potential is a relatively high value and is inversely proportional to the temperature and directly proportioned to the pressure of the gas around the electrodes.

Upon breakdown, the potential across the gap falls abruptly. The discharge is accompanied by a relatively constant gap-voltage drop for a wide range of current. This gap voltage is relatively low in comparison to the breakdown voltage. For example, under predetermined temperature and pressure conditions, the breakdown of a gap $\frac{1}{8}$" may be 7,000 volts whereas the gap-voltage drop for maintaining the discharge may be of the order of 500 to 600 volts. Fuel is supplied to combustion chamber 12 through an inlet 58. Air is forced into the chamber 12 through inlets 59 from a suitable pump or fan 57.

FIG. 2 is a time plot of voltages occurring in this system. A substantial sine wave 60 is shown in dotted line and represents the voltage wave existing across the secondary winding 24 prior to the breakdown of the discharge across the gap between electrodes 55, 56. As an example of magnitude, this voltage may have an effective value of 5,000 volts and a peak voltage of 7,070 volts. The voltage increases sinusoidally until a point 61 is reached which represents the breakdown potential between the electrodes 55, 56 for the particular temperature prevailing. When the gap ionizes, or breakdown takes place, the potential drops sharply, as indicated by the vertical line 62, because the connection between the electrodes through the arc acts as a substantial short circuit across the secondary winding 24. The vertical drop indicated at 62 continues until a level 63 is reached corresponding to the value which would exist across the secondary 24 if the electrodes were substantially short circuited by a metallic conductor. This alternating current potential will be maintained constant at a predetermined numerical value, although reversing in polarity, such as of the order of 500 volts for a gap of the order of $\frac{1}{16}$" provided the frequency of the pulses is sufficient to prevent deionization of the gap between successive pulses and provided the impedance reflected into the primary winding 23 does not overload the transistors 20, 21. It is therefore important that the sinusoidal voltage return to the sustaining value of 500 volts in a period less than the deionization period to prevent deionization. The arc discharge ordinarily produces a downward slope in the volt-ampere curve, not shown, indicating a negative resistance property. This negative resistance is the property which most affects the system. The arc can be maintained by a continuing source of electrons. These electrons are obtained by the thermionic emission or heating of the anode 55. As the power to the gap is increased, more current flows in the arc because the voltage is relatively constant and the electrons generated by the secondary emission will have more ionization energy, thus exciting more electrons. This causes a high degree of heating and the cathode will glow. By employing predetermined gap spacing and reducing the heat conductivity of the anode, it is possible further to assure a self-maintaining arc and cause sufficient heating to make the anode act as a glow plug. In accordance with the above explanation, it is apparent that an important property of the arc is the negative resistance created by the spark discharge.

The secondary oscillator

When a parallel resonant circuit is shunted by a negative resistance that has an absolute magnitude less than the parallel impedance of the circuit at resonance, oscillations begin and increase in amplitude until limited by the circuit parameters. Although the spark gap is across only the secondary winding of the transformer, there is sufficient stray capacitance in the secondary winding 24 to combine with the inductance of winding 24 to constitute a parallel resonant circuit. When the secondary resonant circuit begins to oscillate, the impedance drops to only that of the ohmic loss in the circuit and maximum power is transferred to the gap. Under these conditions the voltage wave form becomes almost sinusoidal except for the point where the negative resistance takes place in the arc. As stated above, the inverter portion of the circuit operates as a normal inverter until a spark discharge occurs. At this point the inverter begins to oscillate in the form of a feedback oscillator.

The feedback oscillator

The feedback oscillator includes the transistors 20, 21 which act as amplifiers and which do not of themselves exhibit negative impedance but to which positive feedback is applied by means of the transformer 22 so that the system exhibits oscillatory properties. Generally, this type of oscillator generates an essentially sinusoidal wave form. Once the arc is struck between the electrodes 55, 56 the tank circuit, including primary winding 23 and capacitor 50, begins to oscillate and an output voltage appears across the transformer secondary 24. A portion of the voltage induced into the transformer 22 by the primary winding 23 will be induced in the feedback winding 25. The phase of this voltage will be shifted 180° relative to the voltage on the primary winding 23 in a manner well known in the art and this phase shifted voltage is fed to the base circuit of each transistor 20, 21. The transistors amplify the feedback signal and feed this amplified signal through the primary coils 28, 29. This signal induces current flow through the other portion of the primary winding, or coil 30. This relatively small current through the primary winding 23 induces a very high potential in the secondary winding 24 because of the high turns ratio. For example, the primary winding 23 may have 110 turns while the secondary winding 24 may have 7,000 turns. When the potential across the secondary winding reaches a predetermined breakdown or ignition value, determined primarily by the gap length, it establishes an arc across the electrodes 55, 56. When the potential across the electrodes 55, 56 is equal to or greater than the breakdown potential, ionization or breakdown takes place and the gap current is established. Eventually the operation of the transistors becomes non-linear and the circuit produces oscillations of constant amplitude, and under favorable conditions, the secondary current is very nearly sinusoidal and the voltage across the gap corresponds with the straight line 63 in FIG. 2.

From the foregoing explanation, it is apparent that the relatively simple inverter system changes into a relatively complicated system as soon as the arc is established. The output circuit becomes oscillatory and the feedback causes the inverter to change into a power oscillator. This system exhibits numerous advantages. For example, the output is sinusoidal and resonant and therefore maximum power is transferred from the transistors to the spark gap. This power is sufficient to cause not only a continuous arc but also sufficient heating of the anode to vaporize any fuel which contacts the anode. Because of the continuous arc effect, radio frequency interference is held at a minimum as the gap current is very nearly sinusoidal and has a relatively low frequency. When the system changes to one of a power oscillator, the transistors generate more heat than when they merely acted as switched devices. In accordance with aspects of this invention, means are provided for dissipating this heat, which means will be subsequently described.

Referring now to FIGS. 3, 4 and 5, there are depicted front elevational, side and plan views, respectively, of the physical layout of this inverter system. The electronic cmponents of the system are mounted in a suitable cabinet 70 formed of metal or other suitable material and this cabinet is generally rectangular in form. As shown in FIGS. 3 and 5, in the left-hand portions thereof, the windings of transformer 22 are right cylindrical in form and are mounted on the core 33 which is formed from a pair of U-shaped members preferably having a low permeability. For the purposes of this invention, the term low permeability is employed to designate cores having a permeability of less than 500 at 20 gausses and preferably of the order of 100 or less. One example of such a core would be carbonyl iron which is formed of insulated powder, is 99.9% iron and has a permeability of the order of 50 at 20 gausses. This low permeability core constitutes a relatively loose coupling between the several coils and, most important, between the primary winding 23 and the secondary winding 24. Accordingly, variations in the load of the second winding 24 such as by the establishment of a discharge between the electrodes 55, 56 reflects only a relatively small resistive load into the primary winding 23. Thus, the changes in impedance of the secondary circuit have little effect upon the frequency of oscillation and on the current drawn through the transistors 20, 21. The transformer U-shaped members 71, 72 are held together by a pair of bolts 75, 76 which pass through the U-shaped members and have a pair of nuts 77, 78 respectively, threadably engaging the ends thereof such that the heads of the bolts retain in strap 79 on one end and the nuts retain a strap 80 on the opposite end thereof. The transformer 22 is potted in a suitable epoxy 81.

A partition 82 is formed in the cabinet 70 separating the transformer 22 from the remainder of the components for the purposes of isolating the heat generated by the transistors 20, 21 in a manner which will be subsequently described. The partition 82 is provided with a pair of angularly disposed flanges 83, 84 which are joined to the outer walls of the cabinet 70 in any convenient manner, such as by spot welding. The partition 82 acts as a substantial heat barrier for the heat generated by the transistors 20, 21. The partition 82 has a U-shaped notch 85 therein to receive a rubber grommet 86. The rubber grommet 86 receives the conductors 87 from the transformer 22. The transistors 20, 21 are mounted on an L-shaped, substantially thick metallic heat sink member 88 by means of bolts 89 and nuts 90. The bolts 89 pass through suitable apertures in the skirt portions 91, 92 of the transistors 20, 21, respectively, and the nuts 90 engage the threaded portions of the bolts 89. Thus the connection between the skirt portions 91, 92 and the L-shaped member 88 provides for good heat transfer between the transistors and the L-shaped heat sink member 88. Advantageously, the L-shaped member 88 has a plurality of holes 94 in the upper surface thereof and a plurality of holes 95 in the side thereof such that air can be pumped in from an air pump or fan 57, which also supplies air to the inlets 59 of the combustion chamber 12. This air is supplied through an inlet conduit 96 and flows over the surfaces of the transistors 20, 21, over the heat sink 88, through the holes 94 into the chamber containing the capacitor 50 and the resistors 38, 39 and out through the passages 95 of the heat sink 88. Because the L-shaped member is of heavy material in thermally conductive contact with the skirt portions 91, 92 of the transistors 20, 21, the heat generated by the transistors is conducted throughout the heat sink member 88 and is cooled by the passage of the air from the conduit 96 through the passages 94, 95 and over two surfaces of heat sink 88. Thus, even though the inverter system converts from a system in which it is an oscillator employing alternately switching transistors to one in which it is a power oscillator, the system is maintained in a stable condition by the uniform cooling provided by the combination of heat sink and forced air. The spark plug 11 is connected by means of a shielded cable 98, the shield of which is designated 99 and which is connected to the cabinet 70 to eliminate the capacity effect of the cable 98 as indicated at 100. This capacity effect would otherwise reduce the potential between the electrodes 55, 56, shown only in FIG. 1.

In accordance with the patent statutes, the principles of the present invention may be utilized in various ways, numerous modifications and alterations being contemplated, substitution of parts and changes in construction being resorted to as desired, it being understood that the system and apparatus shown in the drawings and described above the particular method set forth are given merely for purposes of explanation and illustration without intending to limit the scope of the claims to the specific details disclosed.

What I claim and desire to secure by Letters Patent of the United States of America is:

1. A semi-conductor ignition system comprising:
   first and second semi-conductors each having output, control, and common electrodes, said common electrodes being inter-connected and returned to a point of fixed potential;
   a source of potential;
   a transformer including at least a first, a second, and a third winding and a magnetic core, said first winding being connected between said control electrodes, said second winding being connected between said output electrodes;
   means including at least a portion of said second winding inter-connecting said output electrodes and said source of potential;
   starting means including a pair of impedance elements connected in series across said source;
   means including said first winding inter-connecting said control electrodes and said starting means;
   means including said second winding and a capacitor connected to define a parallel resonant circuit;
   a fuel combustion chamber;
   a spark plug positioned with its electrodes within said chamber and connected to said third winding;
   means for feeding fuel to the interior of said combustion chamber;

heat sink means mounting said semi-conductors; and means for feeding air under pressure to the interior of said combustion chamber, said last-mentioned means including means for supplying cooling air to said semi-conductors and said heat sink means.

2. The combination according to claim 1 wherein the frequency of said resonant circuit is such that the period between successive values of ionization sustaining voltage is less than the deionization time of said spark plug.

3. In a semi-conductor fuel ignition system for energizing a spark plug type fuel igniter, the combination comprising:
   an oscillator circuit having a substantially sine-wave output including first and second semi-conductors each having output, control, and common electrodes, said common electrodes being interconnected and returned to a point of fixed potential;
   a source of potential;
   a transformer including at least a primary, a secondary and a tertiary winding and a magnetic core, said tertiary winding being connected between said control electrodes, a portion of said primary winding being connected between said output electrodes;
   means including a portion of said primary winding interconnecting said output electrodes and said source of potential;
   oscillator starting means including a pair of impedance elements connected in series across said source;
   means including said tertiary winding interconnecting said control electrodes and said oscillator starting means;
   means including said primary winding and a capacitor connected to define a parallel resonant circuit for controlling the frequency of oscillation of said oscillator circuit; and,
   a fuel igniter connected to said secondary winding to receive alternating current therefrom, said resonant circuit having a frequency such that the period between successive values of ionization sustaining voltage of alternate polarity is less than the de-ionization time of said fuel igniter.

4. The combination according to claim 3 wherein said magnetic core has a magnetic permeability less than one-hundred at twenty gausses whereby the load reflected from said secondary winding to said primary winding when said igniter ionizes is insufficient to change the oscillation frequency of said oscillator circuit.

5. In a transistor ignition system for a fluent material fuel burner including a sine-wave oscillator and a spark discharge gap, comprising:
   a source of potential having a first and a second terminal,
   first and second transistors, each having a collector, base, and emitter, said emitters being interconnected and returned to said first terminal of said source;
   a transformer including a magnetic core, a primary winding, a secondary winding, and a feedback winding having a center tap, said feedback winding being connected between said bases of said transistors, a portion of said primary winding being connected between said collectors and having a center tap connected to said second terminal of said source of potential, said secondary winding being connected to said spark discharge gap to supply alternating current thereto;
   oscillation starting means including a pair of serially-connected resistors connected across said source, said feedback winding center tap being connected intermediate said pair of resistors; and, capacitor means connected across said primary winding to define with said primary winding a resonant circuit with a ratio of inductance to capacitance such that the period between successive values of ionization sustaining potential of alternate polarity is less than the deionization time of said spark gap.

6. The combination according to claim 5 wherein said magnetic core has a permeability less than one-hundred at twenty gausses whereby changes in the impedance of said load do not change the resonant frequency of said resonant circuit.

References Cited by the Examiner
UNITED STATES PATENTS

| | | | |
|---|---|---|---|
| 2,976,461 | 3/1961 | Dilger et al. | 315—209 |
| 3,035,108 | 5/1962 | Kaehni | 315—209 |

JAMES W. WESTHAVER, *Primary Examiner.*